(12) United States Patent
Aho et al.

(10) Patent No.: US 11,806,672 B2
(45) Date of Patent: Nov. 7, 2023

(54) METHOD FOR CLEANING A FILTER ELEMENT AND A FILTERING DEVICE

(71) Applicant: Sofi Filtration Oy, Espoo (FI)

(72) Inventors: Simo Aho, Ojakkala (FI); Ville Hakala, Espoo (FI)

(73) Assignee: Sofi Filtration Oy, Espoo (FI)

( * ) Notice: Subject to any disclaimer, the term of this patent is extended or adjusted under 35 U.S.C. 154(b) by 0 days.

(21) Appl. No.: 16/978,912

(22) PCT Filed: Mar. 1, 2019

(86) PCT No.: PCT/FI2019/050166
§ 371 (c)(1),
(2) Date: Sep. 8, 2020

(87) PCT Pub. No.: WO2019/170958
PCT Pub. Date: Sep. 12, 2019

(65) Prior Publication Data
US 2020/0406198 A1    Dec. 31, 2020

(30) Foreign Application Priority Data

Mar. 8, 2018 (FI) .................................... 20185214

(51) Int. Cl.
*B01D 65/02* (2006.01)
*C02F 1/44* (2023.01)
*B01D 29/66* (2006.01)

(52) U.S. Cl.
CPC .............. *B01D 65/02* (2013.01); *C02F 1/444* (2013.01); *B01D 29/66* (2013.01);
(Continued)

(58) Field of Classification Search
CPC ........ B01D 2321/04; B01D 2321/2066; B01D 2321/2075; B01D 2321/40; B01D 29/54;
(Continued)

(56) References Cited

U.S. PATENT DOCUMENTS 4,552,669 A * 11/1985 Sekellick ............. B01D 36/001
210/323.2
5,059,331 A * 10/1991 Goyal .................. B01D 29/114
210/785

(Continued)

FOREIGN PATENT DOCUMENTS

DE    20209240 U1    9/2002
EP     1044713 A1   10/2000

(Continued)

OTHER PUBLICATIONS

International Search Report and Written Opinion for International Application No. PCT/FI2019/050166 dated Jun. 24, 2019.

(Continued)

*Primary Examiner* — Dirk R Bass
(74) *Attorney, Agent, or Firm* — Meunier Carlin & Curfman LLC (57) ABSTRACT

The invention relates to a method for cleaning a filter element made of a porous material. The method comprises directing ultrasound to the filter element, and directing after a predefined time from starting of the ultrasound an impulse to a filtrate reservoir causing filtrate inside the filtrate reservoir to be forced inside the filter element in order to remove particles from the surface of the filter element. Pressure of the impulse is between 4 to 8 times higher than the forward pressure and also that the reverse flux, measured in volume per area time, caused by the impulse is at the minimum 2 to 8 times the feed flux. The invention also relates to a filtering device comprising a filter element made of a porous material.

9 Claims, 4 Drawing Sheets

(52) U.S. Cl.
CPC .. *B01D 2321/2075* (2013.01); *B01D 2321/40* (2013.01); *C02F 2303/16* (2013.01)

(58) Field of Classification Search
CPC ........ B01D 29/66; B01D 29/72; B01D 61/14; B01D 65/02; B01D 65/08; C02F 1/001; C02F 1/008; C02F 1/444; C02F 2303/16
See application file for complete search history.

(56) References Cited

U.S. PATENT DOCUMENTS

| | | | |
|---|---|---|---|
| 5,244,585 A * | 9/1993 | Sugimoto | B01D 61/142 210/791 |
| 5,298,161 A | 3/1994 | Sieg | |
| 2017/0321181 A1 * | 11/2017 | Hazlebeck | C12M 41/48 |

FOREIGN PATENT DOCUMENTS

| | | | | |
|---|---|---|---|---|
| EP | 2301653 A1 | | 3/2011 | |
| EP | 2463241 A1 | | 6/2012 | |
| EP | 2670518 A1 | * | 12/2013 | ............ B01D 65/08 |
| WO | 92/11923 A1 | | 7/1992 | |
| WO | 02/018058 A1 | | 3/2002 | |
| WO | 2012/104493 A1 | | 8/2012 | |
| WO | WO-2015118223 A1 | * | 8/2015 | ........... B01D 36/008 |

OTHER PUBLICATIONS

Search Report for Finnish Application No. 20185214 dated Sep. 24, 2018.

* cited by examiner

METHOD FOR CLEANING A FILTER ELEMENT AND A FILTERING DEVICE

CROSS-REFERENCE TO RELATED APPLICATIONS

This application is a national stage application filed under 35 U.S.C. § 371 of PCT/FI2019/050166 filed Mar. 1, 2019, which claims priority to and benefit of Finnish patent application serial number 20185214 filed Mar. 8, 2018, the content of which is incorporated herein by reference in its entirety.

TECHNICAL FIELD

The invention concerns in general the technical field of cleaning of porous material. Especially the invention concerns cleaning of filter elements made of porous material.

BACKGROUND

Filter elements may be used in filtering devices for example in microfiltration processes or cleaning of liquids. The microfiltration may be used, for example in mining and processing industries and in food and pharmaceutical industries. In addition, for example in pretreatment of ship ballast water and in production of clean water, microfiltration is applicable. Some example applications for microfiltration may be cooling water treatment, treating flue gas waste water, treating waste water before discharge, and providing solids-free water for reverse osmosis. In a wider sense, in all fields where water or any liquid is treated, there may arise a need to filter the finely divided solid material away from the liquid, because the end products of the filtering process are clarified aqueous filtrate and concentrate, i.e. reject.

Typically, the filter elements may be made of porous material, such as ceramic or silicon carbide, or also of sintered metallic powder or wire mesh. The filter element must be washable for securing a good filtering efficiency of the filtering device. Especially, the filter elements having micron size pore size, such as less than 50 μm, are prone to clogging, because particles from the liquid to be clarified get stuck in the pores of the filter element sometimes even leading to cake formation on the filter element.

According to one prior art solution ultrasound is used at feed side of the filtering device, i.e. an ultrasonic element residing outside the filtering device, in order to enhance flux. The ultrasound prevents at least partly the cake formation on the filter element, but it fails to prevent fouling inside the pores of the filter element. Running the ultrasound during the filtering process increases flux, i.e. flow, momentarily, but it allows the particles pass through the filter element resulting that the filtrate may comprise particulates. Furthermore, in the long run, there might be a risk that the ultrasound invites particulates inside the filter element, which in turn decreases the flux in the long run.

According to one prior art solution the filter element may be clarified by using so called backwash, where a filtrate filtered by the filtering device is led back to the filtering device in the opposite direction of normal filtration flow. Furthermore, an ultrasonic element inside the filtering device may be started for cavitating the surface of the filter element at the same time, when the surface of the filter element is flushed with the filtrate by means of the backwash. Moreover, a chemical, such as acid or alkali, cleaning may be combined to the backwash and ultrasound cleaning. The feed of a liquid to be clarified must be interrupted during the cleaning operation causing that the filtering process is on hold during the cleaning of the filter element. Typically, in order to improve the efficiency a double system is employed, wherein one system is filtering and the other system is cleaning. Furthermore, at least one drawback of the prior art solution is that it is not capable to remove particles from the surface of the filter element having micron size pores. Thus, the life-time of the filter elements is substantially short and the filter element needs to be replaced with a new filter element substantially frequently.

SUMMARY

An objective of the invention is to present a method for cleaning a filter element made of a porous material and a filtering device comprising a filter element made of porous material. Another objective of the invention is that the method for cleaning a filter element made of a porous material and the filtering device improve at least partly the cleaning effect on the surface of the filter element.

The objectives of the invention are reached by a method and a filtering device as defined by the respective independent claims.

According to a first aspect, a method for cleaning a filter element made of a porous material is provided, wherein the method comprising: directing ultrasound to the filter element, and directing after a predefined time from starting of the ultrasound an impulse to a filtrate reservoir causing filtrate inside the filtrate reservoir to be forced inside the filter element in order to remove particles from the surface of the filter element.

The pressure of the impulse may be between 4 to 8 times higher than the forward pressure and also that the reverse flux, measured in volume per area time, caused by the impulse may be at the minimum 2 to 8 times the feed flux.

The impulse may be one of the following: a pneumatic impulse, liquid impulse.

The control of the feeding of a liquid to be clarified to the filtering element may not be interrupted during the cleaning of the filter element.

The method may further comprise discharging the impulse from the filter element by adjusting concentrate outflow by means an adjustable concentrate valve.

Alternatively or in addition, the method may further comprise discharging the impulse from the filter element by actuating a discharging device by the force of the impact.

The power of the ultrasound at the surface of the filter element may be between 500 and 4000 watts/square meter, preferably 1500 watts/square meter.

The method may further comprise adjusting the pressure and/or the duration of the impulse.

A pore size of the filter element may be between 0.01 to 30 micrometers.

The predefined time from starting of the ultrasound may be at least 1 second.

According to a second aspect, a filtering device is provided, wherein the filtering device comprising: a filter element made of a porous material, an impulse connection arranged to at least one filtrate outlet connection of the filtering device, a filtrate reservoir arranged between the filter element and the at least one filtrate outlet connection, and an ultrasonic element, wherein the ultrasonic element is configured to direct ultrasound to the filter element and after a predefined time from starting the ultrasound the impulse is directed from an impulse source via the impulse connection to the filtrate reservoir causing that the content of the filtrate reservoir is forced inside the filter element in order to remove particles from the surface of the porous material.

The pressure of the impulse may be between 4 to 8 times higher than the forward pressure and also that the reverse flux, measured in volume per area time, caused by the impulse, may be at the minimum 2 to 8 times the feed flux.

The impulse may be one of the following: a pneumatic impulse, liquid impulse.

The control of the feeding of a liquid to be clarified to the filtering device may not be interrupted during the cleaning of the filter element.

The filtering device may further comprise an adjustable concentrate valve arranged to a concentrate outlet connection of the filtering device, wherein the adjustable concentrate valve may be configured to adjust the concentrate outflow in order to discharge the impulse from the filter element and the filtering device through the concentrate outlet connection.

Alternatively or in addition, the filtering device may further comprise a discharge device arranged to the concentrate outlet connection of the filtering device, the discharge device may be actuated by the force of the impact in order to discharge the impulse from the filter element and the filtering device through the concentrate outlet connection.

The power of the ultrasound at the surface of the filter element may be between 500 and 4000 watts/square meter, preferably 1500 watts/square meter.

The filtering device may further comprise an impulse connection valve configured to adjust the pressure and/or duration of the impulse.

A pore size of the filter element may be between 0.01 to 30 micrometers.

The predefined time from starting of the ultrasound may be at least 1 second.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
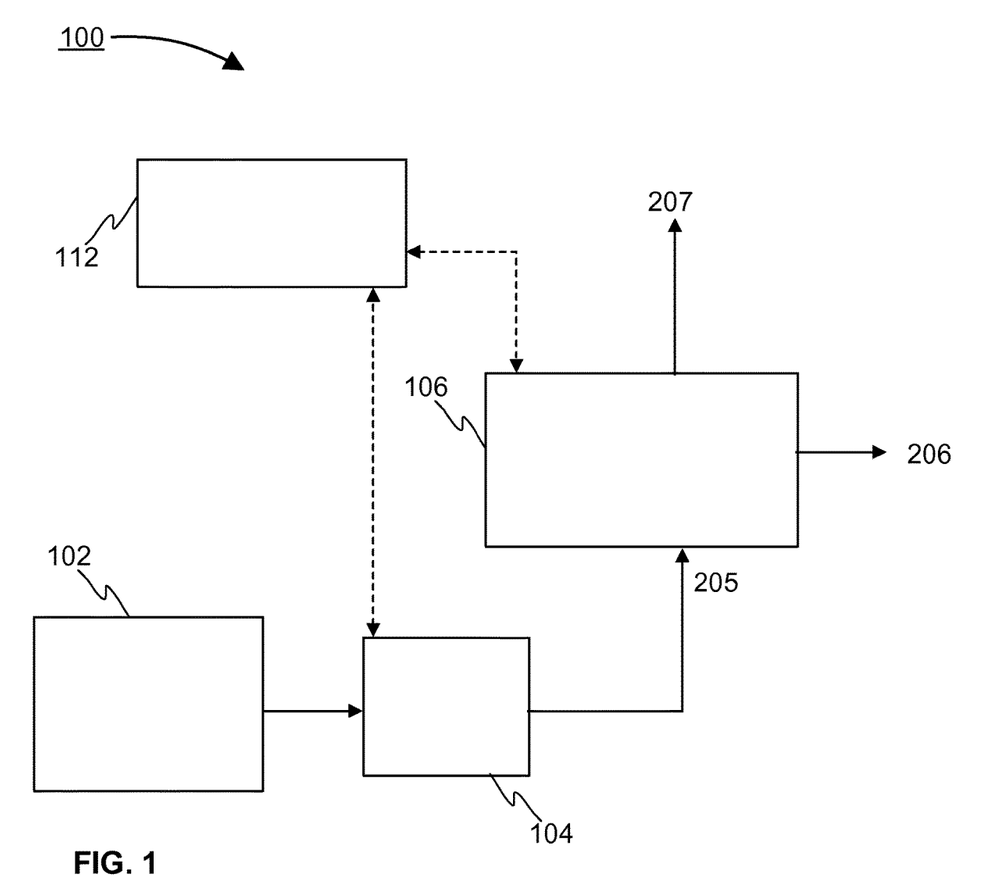
FIG. 1 illustrates schematically an example of a microfiltration system, wherein the embodiments according to the invention may be implemented.

FIG. 1 illustrates schematically an example of a microfiltration system 100, wherein the embodiments according to the invention may be implemented. The microfiltration system 100 may comprise a feed source 102, a feed pump 104, and a filtering device 106. Said components of the system may be connected to each other by lines or pipes, and are thus are in fluid communication. Furthermore, the microfiltration system 100 may further comprise a control unit 112 configured to control the operation of microfiltration system 100.

The feed pump 104 may be configured to feed from the feed source 102 a liquid feed flow comprising solids to the filtering device 106 that is configured to filter the solids away from the liquid feed flow in order to form clarified aqueous filtrate, i.e. product, and concentrate, i.e. reject. The feed source 102 may comprise a reservoir and/or a mixing tank for preserving and/or pre-mixing the liquid feed flow. The liquid to be clarified may be mixed with a sorbent to form a suspension, in which impurities are adsorbed or absorbed by the sorbent particles, so as to form a premixed suspension.

Figure 2:
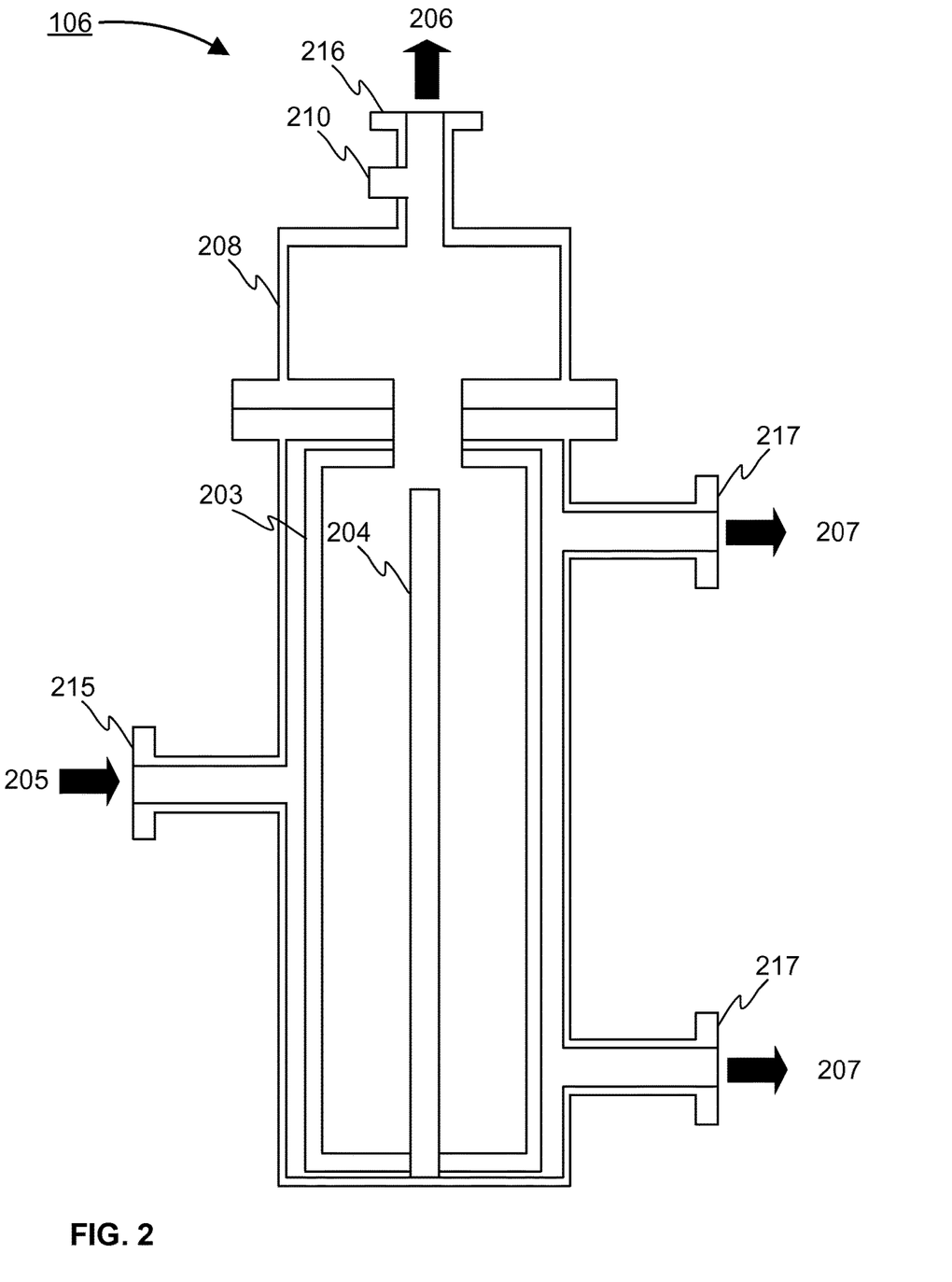
FIG. 2 illustrates schematically an example of a filtering device according to the invention.

The filtering device 106 may be a cross-flow filter or a dead-end filter, for example. FIG. 2 illustrates schematically a simple example of the cross-section of a cylindrical filtering device 106 according to the invention. The filtering device 106 comprises at least one inlet connection 215 for feeding liquid to be clarified 205 into the filtering device 106, a filter element 203, at least one filtrate outlet connection 216 for discharging the clarified filtrate 206 from the filtering device 106, and at least one concentrate outlet connection 217 for discharging the concentrate 207 from the filtering device 106 in order to circulate the liquid to be clarified 205. The filtering device 106 further comprises a filtrate reservoir 208 arranged between the filter element 203 and the at least one filtrate outlet connection 216.

In order to filter the solids away from the incoming liquid 205, the incoming liquid 205 is fed into the filtering device 106 through one or more inlet connections 215 and directed through the filter element 203. The liquid is filtered, when passing through the filter element 203, and is discharged as clarified filtrate 206 through the at least one filtrate outlet connection 216. The concentrate 207 may be circulated from at least one concentrate outlet connection 217 back through to the feed flow 205 of the filtering device 106 to be returned into the filtering device 106. This forms a so-called circulation loop (concentrate circulation) that maintains the velocity of the liquid across the filter element 203.

The filter element 203 is made of porous material, such as ceramic or silicon carbide, or also of sintered metallic powder or wire mesh. The filter element 203 may have a pore size of 0.01 to 30 micrometers.

The filtering device 106 further comprises an ultrasonic element 204 inside the filter element 203 for cleaning the filter element 203. Preferably, the ultrasonic element 204 may be rod-like. The filter element 203 is clarified for securing a good filtering efficiency of the filtering device 106.

In the method according to the invention the cleaning of the filter element 203 is based on a combination of directing ultrasound and high intensity energy impulse to the filter element 203 in order to remove particles from the surface of the filter element 203. In order to provide the impulse, the filtering device 106 comprises further an impulse connection 210 arranged to at least one filtrate outlet connection 216 of the filtering device 106.

Figure 3:
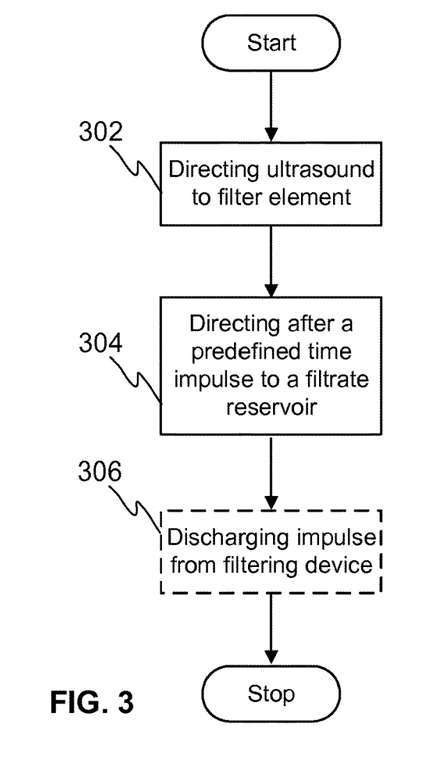
FIG. 3 illustrates schematically an example of a method according to the invention.

Next, an example of the method for cleaning a filter element 203 made of a porous material according to the invention is described by referring to FIG. 3. The method may be implemented in a filtering device 106 according to the invention described above. FIG. 3 schematically illustrates the invention as a flow chart. First the ultrasonic element 204 is started and ultrasound is directed 302 to the filter element 203. After a predefined time from starting of the ultrasound the impulse is directed 304 to the filtrate reservoir 208 causing that filtrate inside the filtrate reservoir 208 is forced inside the filter element 203 in order to remove particles from the surface of the filter element 203. The impulse may be provided by the impulse source and directed via the impulse connection 210 to the filtrate reservoir 208.

Because the ultrasound is directed to the filter element 203 before providing the impulse, the ultrasound aids in dislodging the particles on the surface of the filter element 203 loose. Furthermore, because the ultrasound is directed to the filter element 203 before providing the impulse, there exist no ultrasound absorbing gas bubbles inside the filtering element 203 yet at this stage. The impulse directed to the filtering element 203 disturbs the flow and ultrasound absorbing gas bubbles are formed inside the filtering element 203 causing the efficiency of the ultrasound to decrease. The predefined time from starting of the ultrasound may be for example at least 1 second. Preferably, the predefined time from starting of the ultrasound may be for example between 2 to 7 seconds. The power of the ultrasonic element 204 may be defined as a power at the surface of the filtering element 203 per area unit. For example, the power of the ultrasonic element 204 at the surface of the filtering element 203 may be between 500 and 4000 watts/square meter, preferably 1500 watts/square meter. Alternatively or in addition, the power of the ultrasonic element 203 may be defined by power per liter. For example, if the volume of the filter element 203 is 65 liters, the power per liter is between 7.7 and 62 watts/liter, preferably 23 watts/liter for above presented power values of the ultrasonic element 204 per area unit. The frequency of the ultrasound may be between 20 and 400 kilohertz.

The impulse may be one of the following: a pneumatic impulse, liquid impulse. The impulse may be provided by an impulse source, for example an air compressor, a gas tank, a water supply network, or any source suitable for providing needed pressure for the impulse. The pressure of the impulse may be between 4 to 8 times higher than the forward pressure, i.e. feed pressure. The impulse source may be an internal part of the filtering device 106 connected to the impulse connection 210. Alternatively, the impulse source may be an external impulse source connectable to the impulse connection 210.

The impulse may be defined so that it exhausts the filtrate reservoir 208, but does not feed air of the impulse inside the filter element 203. Furthermore, the impulse may be defined so that the reverse flux, i.e. backwash flux, measured in volume per area time, caused by the impulse, is at the minimum 2 to 8 times the feed flux, i.e. forward flux, of the filtering device 106. The reverse flux direction is opposite with respect to the feed flux direction, i.e. if the sign of the feed flux is considered to be positive, the sign of the reverse flux is negative. The reverse flux caused by the impulse may be defined by the following formula:

$$\text{Reverse flux} = \frac{V}{t}$$

wherein V is the volume of the filtrate directed inside the filter element 203 by the impulse per area and t is the duration of the impulse. The volume of the filtrate directed inside the filter element 203 by the impulse per one square meter surface area of the filter element 203 may be at the minimum 20 liters/m$^2$. For example, if the feed flux of the filtering device 106 is 35000 liters/m$^2$ hour, the reverse flux caused by the impulse is at the minimum 2 to 8 times the feed flux of the filtering device 106 as defined above, and 28 liters of filtrate is directed through one square meter of the filter element 203, the duration of the impulse is between 0.1 and 2.8 seconds.

According to an embodiment of the invention the pressure and/or duration of the impulse may be adjusted. The filtering device 106 may for example comprise an impulse connection valve arranged to the impulse connection 210 configured to adjust the pressure and/or duration of the impulse. Alternatively or in addition, the impulse source may comprise adjusting means in order to adjust the pressure and/or duration of the impulse.

The use of fast and high intensity impulse that has pressure higher than the feed pressure of the filtering device 106 enable that the liquid to be clarified may be fed to the filtering device 106 during the cleaning of the filter element 203. In other words, the cleaning of the filter element 203 according to the invention may be performed while the filtering system 100 is in operation and the control of the feeding of the liquid to be clarified is not interrupted, i.e. the feed pump 104 does not have to be turned off, during the cleaning operation. Keeping the feed pump 104 running during the cleaning of the filter element 203 improves at least partly the efficiency of the filtering device 106 and the efficiency of the whole filtering system 100. Furthermore, feeding the liquid to be clarified to the filtering device 106 during the cleaning of the filter element 203 causes that the flow at the surface of the filter element 203 accelerates and the high-speed concentrate flow removes the particles away from the surface filter element 203, which improves the cleaning effect on the surface of the filter element 203 and is useful specially when the cleaning is provided with the fast impulse. If the feed flow would be interrupted, i.e. stopped, during the cleaning of the filter element 203, the particles would get back to the surface of the filter element 203, when the feed flow would be started again.

Figure 4A:
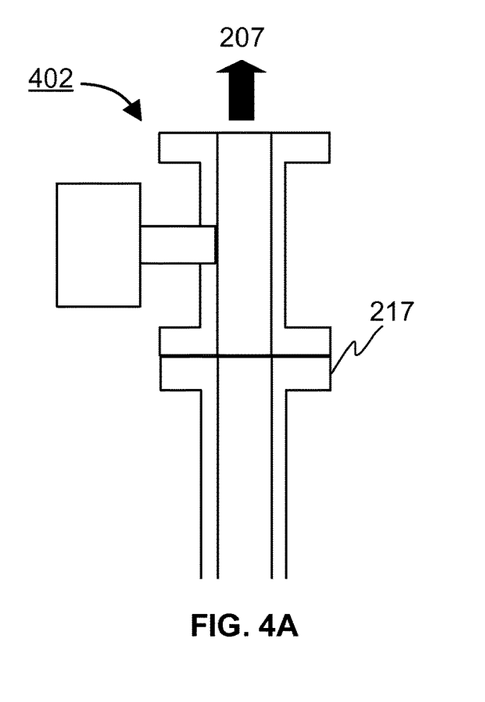
FIGS. 4A-4C illustrate schematically examples of discharging an impulse from a filtering device according to the invention.

According to one embodiment of the invention, the filtering device 106 may further comprise an adjustable concentrate valve 402 arranged to at least one concentrate outlet connection 217 of the filtering device 106. The adjustable concentrate valve 402 may be configured to adjust the concentrate outflow 207 in order to discharge 306 the impulse from the filter element 203 and the filtering device 106 through the at least one concentrate outlet connection 217. FIG. 4A illustrates schematically an example of the adjustable concentrate valve 402 arranged to the concentrate outlet connection 217 of the filtering device 106.

This enables that the impulse may be substantially freely discharged from the filtering device 106 through the concentrate outlet connection 217 in order to enhance the cleaning of the filter element 203. The adjustable concentrate valve 402 may be adjusted to be fully open during the cleaning of the filter element 203 and to be fully closed or nearly fully closed during the filtering process. The adjustable concentrate valve 402 may be adjusted to be fully open a short time, such as 0 to 1 second, before the impulse. Preferably, the adjustable concentrate valve 402 may be adjusted to be fully open 0.5 seconds before the impulse. In comparison to a fixed adjusted concentrate valve 402 the efficiency of the cleaning of the filter element 203 may be improved, because the fixed adjusted concentrate valves are typically adjusted during the commissioning phase of the microfiltration process to be nearly closed in order to optimize the filtering process. If the concentrate valve is during the cleaning of the filter element 203 in the same position as during the filtering process, i.e. fully closed or nearly fully closed and any other methods to discharge the impulse from the filtering device is not used, the impulse cannot be discharged anywhere from the filtering device 106 causing the efficiency of the filtering element 203 to decrease.

The adjustable concentrate valve 402 may be any valve, which adjustment may be automatically controlled. The adjustable concentrate valve may comprise an actuator for moving a modulating element, such as ball or butterfly, of the valve in order to provide the opening and/or closing of the valve. The actuator may be one of the following: pneumatic actuator, electrical actuator, hydraulic actuator. The actuator enables that the valve may be adjusted to any position between fully open and fully closed. Preferably, the adjustment of the valve may be defined as percentage, for example 100% means fully open and 0% means fully closed. Furthermore, the adjustable concentrate valve 402 may comprise a valve positioner for defining the real position of the valve in order to ensure that the valve has reached the desired degree of the opening. The type of the valve may be at least one of the following: ball valve, butterfly valve.

Figure 4B:
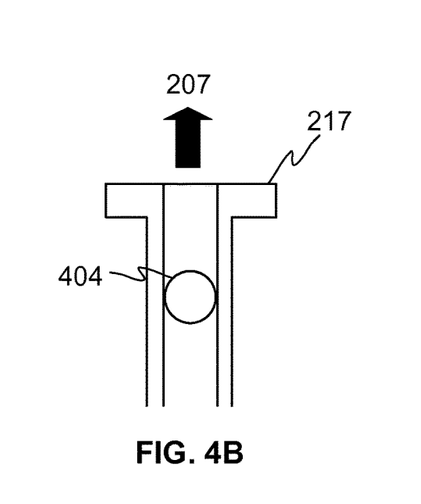

Alternatively or in addition, according to another embodiment of the invention the filtering device 106 may comprise a discharge device arranged to the concentrate outlet connection 217 of the filtering device 106. The discharge device may be actuated by the force of the impact in order to discharge 306 the impulse from the filter element 203 and the filtering device 106 through the concentrate outlet connection 217. The discharge device may be a malleable element 404 made of flexible material. The flexible material of the malleable element 404 may be any material that may sustain constant compression and decompression, for example an elastomer. The malleable element 404 may be configured to be squeezed by the force of the impact in order to discharge 306 the impulse from the filter element 203 and the filtering device 106 through the concentrate outlet connection 217. When the pressure settles down after the discharge of the impulse, the malleable element 404 returns back to its original shape and is ready for a next impulse. According to a non-limiting example the shape of the malleable element 404 may be ball, cube, pyramid or any other shape suitable to be arranged the concentrate outlet connection 217 of the filtering device 106. FIG. 4B illustrates schematically an example of the malleable element 404 according to the invention, wherein the malleable element 404 is a ball.

Figure 4C:
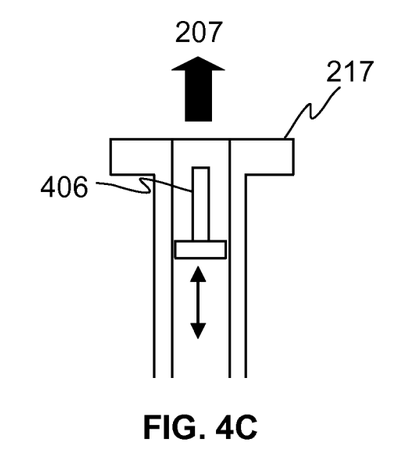

Alternatively, the discharge device may be a mechanical device, for example a piston 406. The piston 406 is configured to be movable along the concentrate outlet connection 217 away from the filter element 203 by the force of the impact in order to discharge 306 the impulse from the filter element 203 and the filtering device 106 through the concentrate outlet connection 217. When the pressure settles down after the discharge of the impulse, the piston 406 returns back to its original position inside the concentrate outlet connection 217 and is ready for a next impulse. FIG. 4C illustrates schematically an example of the piston 406 according to the invention.

If the impulse cannot be discharged from the filter element 203 and the filtering device 106, the efficiency of the cleaning may be decreased. Thus, the above described methods to discharge 306 the impulse from the filtering device 106 improves the efficiency of the cleaning of the filter element 203. The discharging step of the method according to the invention is illustrated in FIG. 3 with a dashed line that illustrates that the discharging step is an optional step of the method according to the invention in order to improve the efficiency of the cleaning of the filter element 203.

Figure 5:
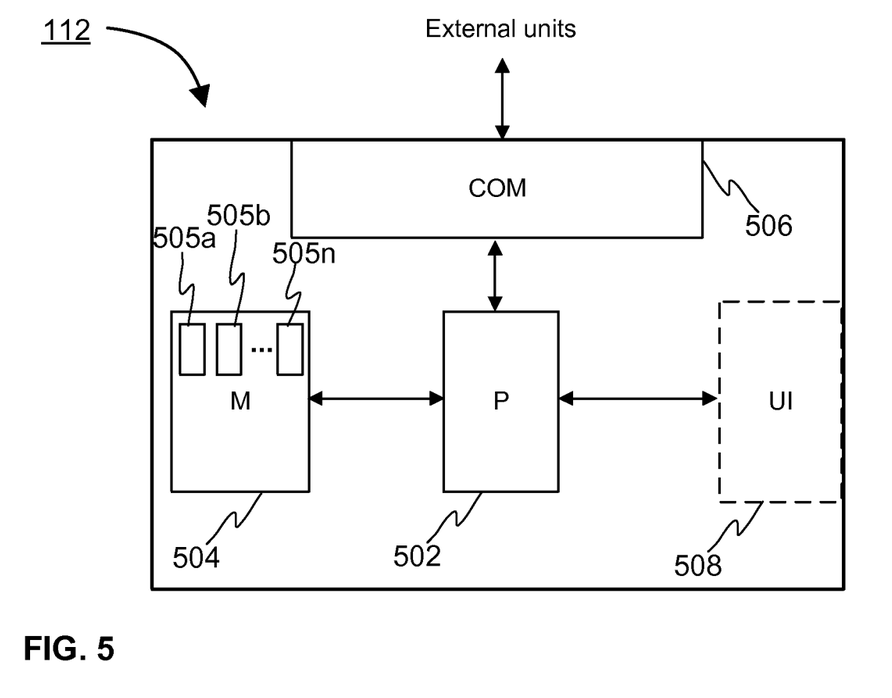
FIG. 5 illustrates schematically an example of a control unit according to the invention.

FIG. 5 discloses a schematic example of a control unit 112 according to the invention. Some non-limiting examples of the control unit 112 may e.g. be a server, personal computer, laptop computer, computing circuit, a network of computing devices, mobile communication device. The control unit 112 may comprise at least one processor 502, at least one memory 504 for storing portions of computer program code 505a-505n and any data values, a communication interface 506, and possibly one or more user interface units 508. Said elements of the control unit 112 may be communicatively coupled to each other with e.g. an internal bus.

The at least one processor 502 of the control unit 112 is at least configured to control the operation of microfiltration system 100. The implementation of the controlling may be achieved by arranging the at least one processor 502 to execute at least some portion of computer program code 505a-505n stored in the at least one memory 504 causing the at least one processor 502, and thus the control unit 112, to control the operation of the microfiltration system 100. The at least one processor 502 is thus arranged to access the at least one memory 504 and retrieve and store any information therefrom and thereto.

The control unit 112 may be configured to control the operation of the one or more of the components of the microfiltration system 100 based on at least one operational parameter the microfiltration process received from one or more sensors arranged to the microfiltration system 100 and configured to obtain at least one operational parameter of the microfiltration process. The at least one operational parameter may be one of the following: filtrate flow, feed pressure, concentrate pressure, temperature of the feed, amount of the solids in the feed, turbidity of the feed, conductivity of the feed, pH value of the feed. The at least one sensor for obtaining the at least one operational parameter may be one of the following: flowmeter, pressure meter, temperature meter, water quality monitoring system. Alternatively or in addition, the control unit 112 may be configured to control the operation of the one or more of the components of the microfiltration system 100 based on user input via the user interface units 508.

Moreover, the at least one processor 502 is configured to control the communication through the communication interface 506 with the filtering device 106, the impulse source, the feed pump 104, the adjustable concentrate valve 402, and/or any other external unit. The control unit 112 may be configured to generate at least one control signal to the filtering device 106, the impulse source, and/or the feed pump 104 in order to control the operation of each component of the filtering system 100. Alternatively or in addition, the control unit 112 may be configured to generate at least one control signal to the adjustable concentrate valve 402 of the filtering device 106 in order to control the adjustment of the adjustable concentrate valve 402.

For sake of clarity, the processor herein refers to any unit suitable for processing information and control the operation of the control unit 112, among other tasks. The operations may also be implemented with a microcontroller solution with embedded software. Similarly, the at least one memory 504 of the control unit 112 is not limited to a certain type of memory only, but any memory type suitable for storing the described pieces of information may be applied in the context of the present invention. Moreover, the at least one memory 504 may be volatile or non-volatile.

The communication interface 506 may be configured to provide an interface for communication with the filtering device 106, the impulse source, the feed pump 104, the adjustable concentrate valve 402, any external unit, database and/or external systems. The communication interface 506 may be based on one or more known communication technologies, either wired or wireless, in order to exchange pieces of information. The one or more user interface units 508 may be configured to input control commands, receive information and/or instructions, and/or display information. The user interface units 508 may comprise for example at least one of the following: a touchscreen, at least one function key, a wired or wireless remote controller, a display.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for cleaning a filter element made of a porous material, the method comprising:
   directing, by an ultrasonic element, ultrasound to the filter element, wherein the ultrasonic element is inside the filter element, and
   directing, after a predefined time from starting of the ultrasound, an impulse to a filtrate reservoir causing filtrate inside the filtrate reservoir to be forced inside the filter element in order to remove particles from the surface of the filter element, wherein pressure of the impulse is between 4 to 8 times higher than the forward pressure, and the reverse flux, measured in volume per area time, caused by the impulse is at the minimum 2 to 8 times the feed flux.

2. The method according to claim 1, wherein the impulse is one of the following: a pneumatic impulse or a liquid impulse.

3. The method according to claim 1, wherein the control of the feeding of a liquid to be clarified to the filtering element is not interrupted during the cleaning of the filter element.

4. The method according to claim 1, wherein the method further comprises discharging the impulse from the filter element by adjusting concentrate outflow by means of an adjustable concentrate valve.

5. The method according to claim 1, wherein the method further comprises discharging the impulse from the filter element by actuating a discharge device by the force of the impact.

6. The method according to claim 1, wherein the power of the ultrasound at the surface of the filter element is between 500 and 4000 watts/square meter, preferably 1500 watts/square meter.

7. The method according to claim 1, wherein the method further comprises adjusting the pressure and/or the duration of the impulse.

8. The method according to claim 1, wherein a pore size of the filter element is between 0.01 to 30 micrometers.

9. The method according to claim 1, wherein the predefined time from starting of the ultrasound is at least 1 second.

* * * * *